March 2, 1971   R. P. INGRAM   3,567,620
APPARATUS AND PROCESSES FOR THE MANUFACTURE OF OZONE
Filed May 6, 1968
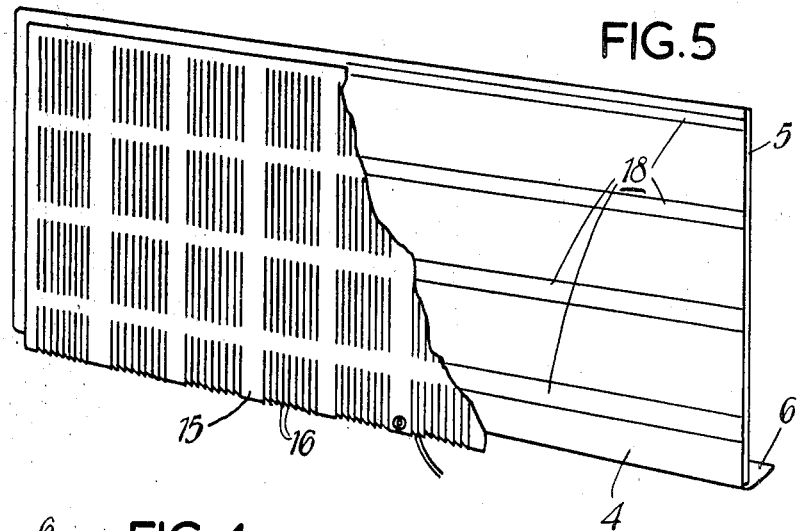
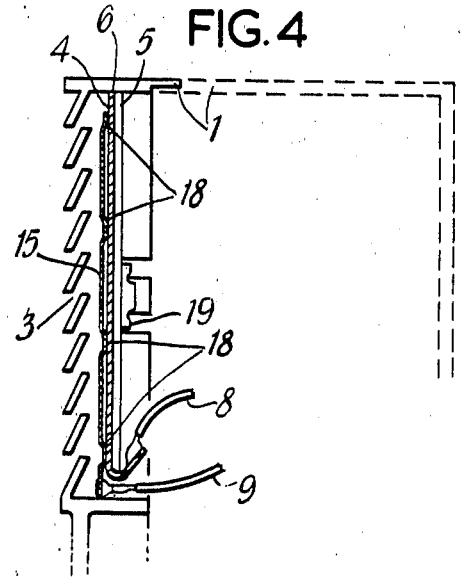
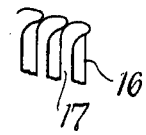
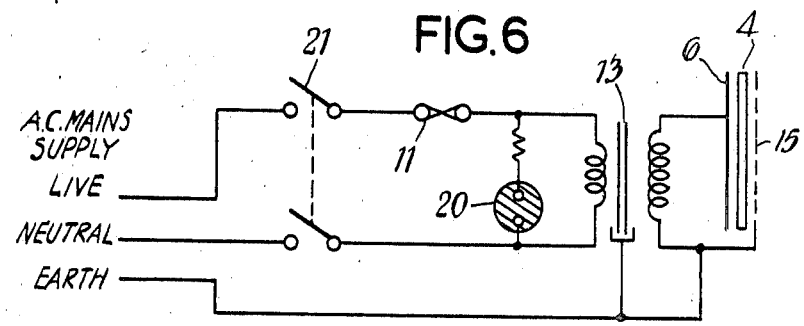

United States Patent Office 3,567,620
Patented Mar. 2, 1971

3,567,620
APPARATUS AND PROCESSES FOR THE
MANUFACTURE OF OZONE
Rex Peter Ingram, Camberley, England, assignor to
O-Three Instruments Limited, Weybridge, Surrey, England
Filed May 6, 1968, Ser. No. 726,731
Claims priority, application Great Britain, May 12, 1967,
22,084/67
Int. Cl. C01b 13/12
U.S. Cl. 204—313                8 Claims

ABSTRACT OF THE DISCLOSURE

The specification discloses a compact apparatus for freshening air by the manufacture of ozone comprising a plane metallic electrode, an insulating film covering one surface of that electrode, and a perforated metallic sheet, for example a sheet of metallic gauze or a perforated anodised aluminium sheet, in contact with the side of the insulating film remote from the metallic electrode. An electric potential is applied between the metallic electrode and the perforated metallic sheet sufficient for producing ozone in the interstices of the perforated metallic sheet, and the interstices of the perforated metallic sheet are directly accessible to the air or atmosphere to be freshened so that the ozone which is produced is able to disperse immediately into the air.

SUMMARY OF THE INVENTION

This invention relates to apparatus and processes for the manufacture of ozone in quantities suitable for the freshening or purification of air.

It is well known that ozone present in the atmosphere in very small quantities creates a pleasant impression, and by reason of its extremely oxidising properties ozone is a very active material for the destruction of bacteria which may be present.

It has previously been proposed that an atmosphere may be freshened and purified by producing in it ozone in small quantities. It is an object of the present invention to provide a new apparatus and method for the production of ozone in such quantities as to be acceptable in the freshening of air, the apparatus being small in size, cheap to produce and economic in operation.

In accordance with the present invention it is proposed to generate an electric potential between an electrode and a perforated metallic sheet, each of which is maintained in contact with a respective opposite surface of a film of electrically insulating material. In order to provide simplicity of manufacture the present invention provides that the three integers, namely the metallic electrode, the film of electrically insulating material and the perforated metallic sheet, all be substantially planar and the apparatus in accordance with the present invention may therefore be made very compact.

More specifically in accordance with the present invention there is provided apparatus for freshening air by the manufacture of ozone, comprising a planar metallic electrode, a planar electrically insulating film covering one surface of the metallic electrode, a perforated metallic sheet in contact with that surface of the electrically insulating film which is remote from the metallic electrode and which is exposed to the air to be freshened, means for applying an electric potential between the metallic electrode and the perforated metallic sheet, and means for maintaining the metallic electrode, the electrically insulating film and the perforated metallic sheet in intimate contact respectively with one another, whereby ozone may be produced within the interstices of the perforated metallic sheet upon application of the electric potential.

The insulating film which is present between the metallic electrode and the perforated metallic sheet must have a high electrical breakdown strength and a high permittivity, and must also be mechanically strong and resistant to chemical attack. Some thermoplastic materials have these necessary properties, and it is preferred that the electrically insulating film is a film of thermoplastic material selected from the group consisting of polyesters, polyolefins and polystyrene.

The electrically insulating film advantageously has a thickness of the order of three thousandths of an inch, and in the embodiments of the invention which will be described the electrically insulating film is a film of the polyester obtainable under the trade name Melinex having such a thickness.

The perforated metallic sheet which is used in the apparatus according to the present invention may be a metallic gauze and a gauze having between 20 and 40 wires per linear inch is suitable. A stainless steel gauze having 30 wires to the inch has been found to give excellent results with the Melinex film mentioned, and an electric potential of 1,200 volts applied between the metallic electrode and the stainless steel gauze.

Alternatively the perforated metallic sheet may be an anodised aluminium sheet, and such a sheet perforated with rectangular slots formed with substantially smooth edges is employed in a preferred embodiment of the invention which will be described with reference to the later figures of the accompanying drawings.

The metallic electrode may be an electrode having a thickness such as to provide its own rigidity, but it is preferred for the metallic electrode to comprise an electrically conductive foil carried by a sheet of insulating material.

In accordance with the particular preferred embodiment of the invention there is provided apparatus for freshening air by the manufacture of ozone comprising a housing having a front wall with apertures therein for permitting the passage of air through the front wall, an integral electrode assembly situated immediately within the front wall of the housing, the electrode assembly comprising an electrically insulating film of thermoplastic material selected from the group consisting of polyesters, polyolefins and polystyrene, the electrically insulating film being arranged as a sheet in a plane substantially parallel to the front wall of the housing, a planar metallic electrode secured to the surface of the electrically insulating film remote from the front wall of the housing, and a perforated metallic sheet adhered near a pair of its opposed edges to that surface of the electrically insulating film which is nearer to the front wall of the housing, the adherence of the perforated metallic sheet to the electrically insulating film being such as to hold the perforated metallic sheet with the perforated area of one surface in close contact with, but not adhering to, the surface of the electrically insulating film which is nearer to the front wall of the housing, and the perforated metallic sheet being so constituted as to include exposed surfaces, each lying in a curved contour extending from parts of the surface of the perforated metallic sheet which are in contact with the electrically insulating film gradually away from the electrically insulating film, and means for applying an electric potential between the planar metallic electrode and the perforated metallic sheet, whereby ozone may be produced from air situated between the electrically insulating film and those parts of the perforated metallic sheet whose surfaces first curve away from contact with the electrically insulating film.

Experiments have shown that, when the perforated metallic sheet is formed as a planar sheet having apertures or perforations therein rather than as a metallic gauze, it is necessary for the apertures or perforations in the previously imperforate metallic sheet to be formed by bending in a smooth or curved contour those parts of the metal which are displaced from the imperforate sheet in order to create the apertures or perforations. According to this feature of the present invention therefore the constitution of the exposed surfaces of the perforated metallic sheet, which lie in a curved contour, are formed by bending parts of the metal displaced from an imperforate planar metallic sheet to provide the perforations therein in such a manner as to maintain the rigidity of the perforated metallic sheet between its adhered edge parts.

In the particular embodiment of this preferred form of the invention which will be described with reference to FIGS. 4, 5 and 5A, the perforated metallic sheet includes parallel series of longitudinal slots, each slot being substantially perpendicular to strips of adhesive which effect the adherence of the perforated metallic sheet to the electrically insulating film near a pair of opposed edges of the perforated metallic sheet.

Advantageously the perforated metallic sheet is comprised by an anodised aluminium sheet.

The present invention also comprehends a process for purifying or freshening air by the manufacture of ozone, wherein the ozone is produced by ionization of air within the interstices of a perforated metallic sheet by applying, between parts of the perforated metallic sheet and another electrode seperated from those parts of the perforated metallic sheet by a film of a solid electrically insulating material and a film of air, an electric potential sufficient to cause the said ionization.

In order that the present invention may be better understood the following detailed description of embodiments thereof is made, by way of example, with reference to the accompanying diagrammatic drawings, in which:

FIG. 4 is a sectional view of an alternative embodiment of the invention employing a perforated anodised aluminium sheet;

FIG. 5 is a perspective view of that part of the apparatus of FIG. 4 which comprises the perforated metallic sheet, the electrically insulating material and the electrode with part of the perforated metallic sheet broken away;

FIG. 5A is an enlarged view of a part of the perforated metallic sheet showing the configuration of part of each of three of the slots formed in the perforated metallic sheet, and FIG. 6 is an operating circuit for operating the apparatus of FIG. 4 to produce ozone and thereby to purify and freshen the air.

In the drawings the same or similar parts are designated by like reference numerals.

Figure 1:
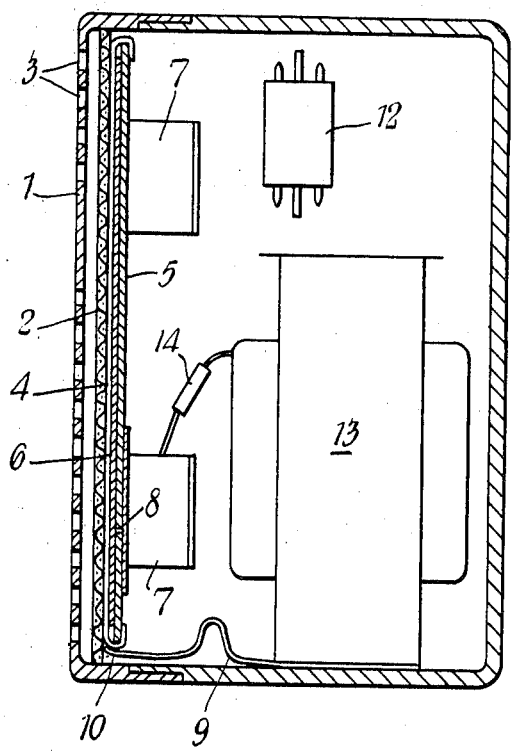
FIG. 1 is a side view in part section of an apparatus in accordance with the invention using a metallic gauze as the perforated metallic sheet.
Figure 2:
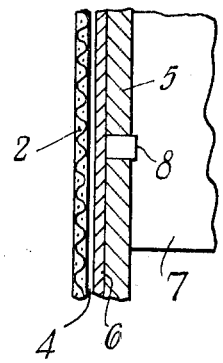
FIG. 2 is an enlarged view of that part of the apparatus of FIG. 1 which comprises the electrode, the electrically insulating film and the metallic gauze.

Referring to the drawings, and particularly to FIGS. 1 and 2, there is shown a plastic housing or case 1 within which there is mounted a stainless steel gauze 2 having 30 wires to the linear inch, each wire having a surface which is curved. The stainless steel gauze 2 is maintained a desired spaced distance from the front or lefthand side of the plastic case 1 (as seen in FIG. 1) by a set of vertical plastic ribs (not shown in FIG. 1). The wall of the plastic case 1 adjacent to the stainless steel gauze 2 has openings or louvres 3 through which air may circulate through the stainless steel gauze 2.

In contact with the side of the stainless steel gauze 2, remote from the wall of the plastic case 1 containing the louvres 3, is an electrically insulating film 4 of the polyester material sold under the trade name Melinex, the film 4 having a thickness of a few thousandths of an inch. It has been found that for a good life the thickness of the film 4 should be rather more than one thousandth of an inch, and it is believed that the optimum thickness of the film 4 is approximately three thousandths of an inch. The film 4 is secured around the ends of a board 5 of electrically insulating material (for example that obtainable under the trade name Tufnol), the board 5 carrying on that surface which is covered by the electrically insulating film 4 an electrically conductive foil 6 which constitutes a metallic electrode. The electrically conductive foil 6 may be, for example, a copper foil.

Curved pressure springs 7 are fixed to the plastic case 1 and act on the electrically insulating board 5 so that the electrically conductive foil 6 is pressed against the electrically insulating film 4, which is in turn pressed against the stainless steel gauze 2 which is supported by the vertical plastic ribs already mentioned. The electrically insulating board 5 has electric contacts made either through its thickness, as shown at 8, or around its edge to engage with the curved pressure springs 7 which are thus used as the electrical connections to the metallic electrode 6.

The electrical connection to the stainless steel gauze 2 is made by a contact spring 9, the front end 10 of which presses between the electrically insulating film 4 and the stainless steel gauze 2.

Figure 3:
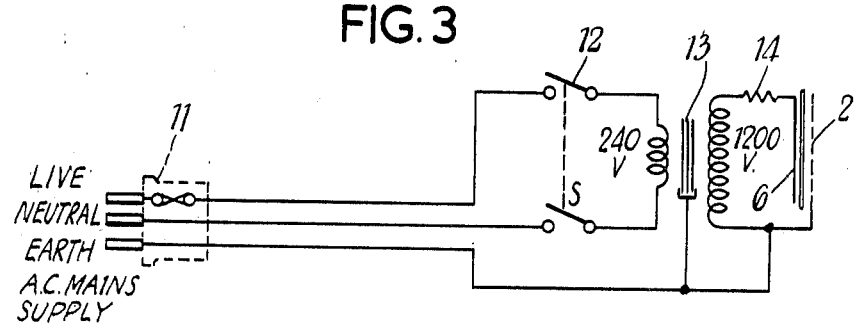
FIG. 3 is an operating circuit for operating the apparatus of FIG. 1 to produce ozone and thereby to freshen and purify the air.

A suitable circuit for operating the apparatus of FIG. 1 to produce ozone and thereby to freshen and purify the air in a room in which the apparatus is placed is shown in FIG. 3. Connection to the standard A.C. mains is made through a fused mains plug 11 and a local operating switch 12 enables the mains to be connected to a mains transformer 13 which, in the arrangement being described, gives an output voltage of approximately 1200 volts R.M.S. for an input of 240 volts R.M.S. The high voltage secondary of the transformer 13 is connected to the pair of electrodes constituted by the stainless steel gauze 2 and the electrically conductive foil 6. For the sake of safety the outer electrode which is the stainless steel gauze 2 is connected to earth, and the transformer lead to the electrically conductive foil 6 includes a protective resistor 14. The protective resistor 14 acts as a current limiter in case of an accidental short circuit of the electrode leads in the secondary circuit of the transformer 13. The primary circuit of the transformer 13 is protected by the fuse in the fused mains plug 11.

Closing of the switch 12 with application of the supply voltage creates a high electric stress in the air in the interstices of the stainless steel gauze 2 and also in the air in the immediate neighbourhood of the stainless steel gauze 2. The greatest electric stress present in the air is that which exists in the air between the curved surface contour of wires in the gauze 2 and the surface of the electrically insulating film 4, particularly where the surfaces of the wires first curve away from contact with the electrically insulating film 4. The oxygen in the air which is subjected to this high electric stress becomes ionized and ozone is produced. This ozone is free to permeate into the atmosphere of the room containing the apparatus through the louvres 3 in the plastic case 1.

An alternative embodiment of the invention which is preferred to the embodiment previously described for a number of reasons will now be described with particular reference to FIGS. 4 and 5. As in the embodiment of FIG. 1, a plastic housing 1, preferably of rigid polypropylene, contains the apparatus and has louvres 3 formed by angled lengths of plastic instead of the simple perforations of FIG. 1. Within the housing 1 and adjacent to the louvres 3, there is mounted a 20 gauge anodised aluminium sheet 15 which is perforated and which has its perforated portions bent, so that small rectangular slots 16 (see FIGS. 5 and 5A) are formed. The rectangular slots 16 are formed in such a way that the material of the sheet 15 is displaced outwardly towards the louvres 3, as shown at 17 in FIG. 5A, to leave a substantially smooth surface on the opposite side of the perforated aluminium sheet 15. This substantially smooth surface is in contact with the electrically insulating film 4, and the bent parts 17 of the sheet 15 which are deformed to produce the perforations or apertures in the sheet 15 constitute surfaces of curved contour extending gradually away from the surface contact with the electrically insulating material 4.

In accordance with the embodiment of FIGS. 4 and 5, a composite unit obtainable under the trade name Cumel is employed, and this provides both the electrically insulating film 4 of Melinex dielectric and the electrode comprised of a copper foil 6. The Cumel unit is four thousandths of an inch thick and this thickness is made up of three thousandths of an inch of the Melinex polyester material and one thousandth of an inch thickness of copper. The Cumel unit is cemented to the electrically insulating board 5, which is preferably made of S.R.B.P. or Bakelite, and which preferably has a thickness of the order of one sixteenth of an inch.

The Cumel unit has, on the exposed surface of the electrically insulating film 4, lines of adhesive material such as those indicated at 18, and the perforated aluminium sheet 15 is cemented onto the electrically insulating film of Melinex polyester using these lines of adhesive. It is necessary that the perforated aluminium sheet 15 be held in a position such that the rectangular slots 16 are in close contact with the electrically insulating film 4, but the slots should not be directly adhered to the electrically insulating film 4 because the adhesive will then prevent air from entering between the curved contour surfaces of the bent parts 17 and the surface of the electrically insulating film 4, and will inhibit the efficient production of ozone. Consequently the slots 16 in the perforated aluminium sheet 15 are arranged, as illustrated in FIG. 5, to extend across the areas of the aluminium sheet 15 which are not in contact with lines of adhesive 18.

Preferably lines of adhesive such as 18 are provided only near a pair of opposite edges of the perforated aluminium sheet 15, and the perforated aluminium sheet 15 is effectively tensioned between these two lines of adhesive so that it is held with the slots 16 in close contact with the electrically insulating film 4.

The manner in which the slots 16 are formed in the perforated aluminium sheet 15 as already described is such as to enhance the rigidity of the perforated aluminium sheet 15 when the sheet 15 is tensioned between the two lines of adhesive 18 near opposed edges of the sheet 15.

The perforated aluminium sheet 15 is smaller in size than the copper electrode 6 in order to ensure that external tracking is prevented. The cementing of the electrode assembly, which comprises the perforated metallic sheet 15 and the Cumel board containing the electrically insulating film 4 and the copper foil electrode 6, minimises vibration effects and the need for pressure springs 7 is removed, with the result that the assembly may be held in place by using a pair of simple metal grip clips 19 one at each side of the assembly.

In FIG. 6 there is shown an electrical circuit arrangement for operating the apparatus of FIGS. 4 and 5, although the circuit is equally suitable for operating the embodiment of FIGS. 1 and 2. So far as the electrical circuitry is concerned, FIG. 6 is essentially similar to the arrangement of FIG. 3, but the resistance of the transformer secondary winding is sufficiently high to enable the secondary circuit to dispense with a special protective resistor.

Additionally included in the circuit of FIG. 6 is a small neon lamp 20 which is arranged to be viewable from the front of the housing 1 to indicate when the apparatus is switched on.

The embodiment of the invention illustrated in FIGS. 4 and 5 of the accompanying drawings is preferred to the embodiment illustrated in FIGS. 1 and 2, because the apparatus of FIGS. 4 and 5 is just as efficient in the production of ozone, is simpler and easier to make, is more pleasing in appearance, and is a good rigid construction which is not subject to significant vibration during operation.

The ozone which is introduced into the air by the apparatus described is found to remove impurities and odours in a room which is occupied by human beings, for example the smell of cigarette smoke is removed. Also the presence of the ozone acts as a bactericide, so that the apparatus may with advantage be included in cold storage rooms for food so that the food is preserved for a longer time.

The quantity of ozone which is produced, and which enters the atmosphere as a whole is very small and considerably less than one part per million of the atmosphere as a whole.

It will be understood that it is believed that ozone is produced primarily from the air which is immediately adjacent to part of the perforated metallic sheet and to the electrically insulating film. When a metallic gauze is used as the perforated metallic sheet, the mesh size of 30 wires to the linear inch is thought to be the most advantageous, because a substantially finer mesh will restrict the air flow through the gauze and a mesh larger than 30 wires to the linear inch reduces the effective electrode or ionizing area.

The apparatus in accordance with the present invention is very compact, and may be assembled in a case having a cross-section of only 3½ inches by 4 inches. The arrangement also enables electric potentials of the order of 1,000 to 1,200 volts to be used, and these potentials are very much less than the potentials used in previous apparatus for the production of ozone for similar and other purposes.

Where the apparatus in accordance with this invention is used in domestic applications, the fact that the voltage required is as low as 1,200 volts confers the important benefit that the generation of electro-magnetic radiation of wavelengths liable to interfere with reception of radio and television signals is entirely avoided.

I claim:

1. Apparatus for freshening air by the manufacture of ozone comprising a housing having a front wall with apertures therein for permitting the passage of air through the front wall, an integral assembly of planar electrodes situated immediately within the front wall of the housing, the electrode assembly comprising an electrically insulating film arranged in a plane substantially parallel to the front wall of the housing, a planar electrode secured to the surface of the electrically insulating film remote from the front wall of the housing and a perforated metallic sheet located adjacent to that surface of the electrically insulating film which is nearer to the front wall of the housing in such manner that the perforated metallic sheet is maintained with at least the major part of the perforated area of one surface in close contact with, but not adhering to, the surface of the electrically insulating film which is nearer to the front wall of the housing and the perforated metallic sheet having at the edge of each perforation an exposed surface which lies in a curved contour extending, from a part of the surface of the metallic electrode which is in contact with the electrically insulating film, gradually away from the electrically insulating film, and means for applying an electric potential between the planar electrode and the perforated metallic sheet whereby ozone may be produced from air situated between the electrically insulating film and those parts of the said exposed surfaces which first curve away from contact with the electrically insulating film.

2. Apparatus according to claim 1, wherein the perforated metallic sheet is a sheet perforated with rectangular slots formed with substantially smooth edges.

3. Apparatus according to claim 1, wherein the electrically insulating film is a film of thermoplastic material selected from the group consisting of polyesters, polyolefins and polystyrene.

4. Apparatus according to claim 1, wherein the perforated metallic sheet is comprised by an anodised aluminum sheet.

5. Apparatus according to claim 1, wherein the constitution of the exposed surfaces of the perforated metallic sheet, which lie in a curved contour, are formed by bending parts of the metal displaced from an imperforate planar metallic sheet to provide the perforations therein in such a manner as to maintain the rigidity of the perforated metallic sheet between its adhered edge parts.

6. Apparatus according to claim 5, wherein the perforated metallic sheet includes parallel series of longitudinal slots, each slot being substantially perpendicular to strips of adhesive which effect the adherence of the perforated metallic sheet to the electrically insulating film near a pair of opposed edges of the perforated metallic sheet.

7. Apparatus according to claim 3, wherein the electrically insulating film is a film of polyester of thickness of the order of three thousandths of an inch.

8. Apparatus according to claim 7, wherein the planar electrode comprises a metallic film supported on the insulating material.

References Cited

UNITED STATES PATENTS

| | | | |
|---|---|---|---|
| 788,557 | 5/1905 | Sahlström | 204—317 |
| 1,725,661 | 8/1929 | McPartland | 204—314 |
| 1,891,916 | 12/1932 | Conley | 204—317 |
| 2,113,913 | 4/1938 | Cragun | 204—317X |
| 3,081,215 | 3/1963 | Held et al. | 204—313X |

JOHN H. MACK, Primary Examiner

N. A. KAPLAN, Assistant Examiner

U.S. Cl. X.R.

204—317